July 15, 1930. W. E. HOLSCLAW ET AL Re. 17,732

PIPE AND TUBE BENDER

Original Filed Dec. 6, 1927

Inventor,

Walter Etes Holsclaw
Harry Elstner Holsclaw

By W. N. Strealin Atty.

Reissued July 15, 1930 Re. 17,732

UNITED STATES PATENT OFFICE

WALTER ESTES HOLSCLAW AND HARRY ELSTON HOLSCLAW, OF EVANSVILLE, INDIANA

PIPE AND TUBE BENDER

Original No. 1,687,210, dated October 9, 1928, Serial No. 238,157, filed December 6, 1927. Application for reissue filed February 4, 1930. Serial No. 425,919.

This invention relates to an improved portable pipe and tube bender.

The object of the invention is to provide a simple, inexpensive, light, portable machine which will be adapted for bending pipes and tubes of different sizes and materials and will be capable of manipulation by the hands of the operator without having to be attached to a bench, shelf, upright, or other support.

As hereinafter described in detail, the complete machine or appliance comprises a body having a tube or pipe engaging hook, a handle attached to, or formed integral with the body which may be grasped by one of the hands of the operator, a bending sheave provided with gear teeth or a mutilated gear, a pinion journalled in the body and adapted to mesh with the aforesaid gear teeth or mutilated gear and having a handle which may be grasped by the remaining hand of the operator, and a bending plate secured to the sheave as, for instance, to a flat part thereof, which is provided with a hook adapted to engage the tube or pipe when the latter is located between the hook on the body and the sheave, whereby when the handle for the pinion is turned in the proper direction, the bending plate will, by its grip on the tube or pipe, in conjunction with the sheave, effect the desired bend. The machine is adapted to slightly bend a pipe or tube or to bend it to any desired angle or in any desired curve, according to the manipulation of the two handles of the machine.

Figure 1:
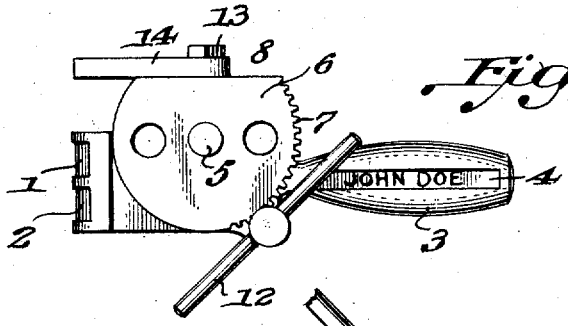
Figure 1 is a side elevation.
Figure 2:
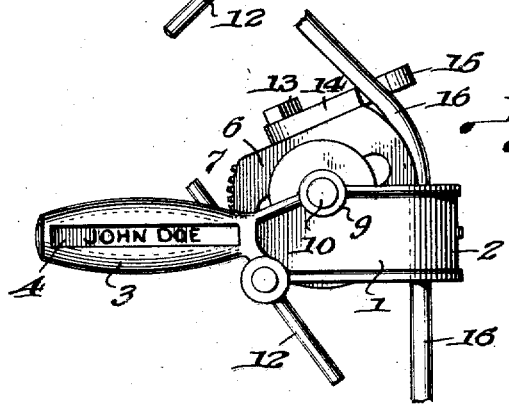
Fig. 2 is a side elevation showing how pipe or tube is bent by the appliance.
Figure 3:
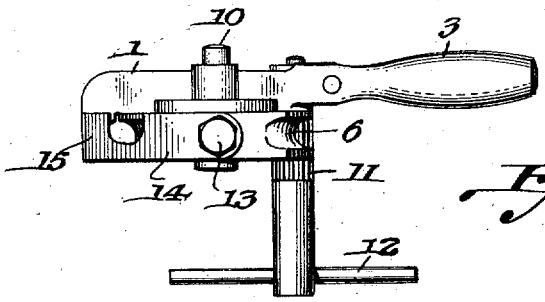
Fig. 3 is a plan view.
Figure 4:
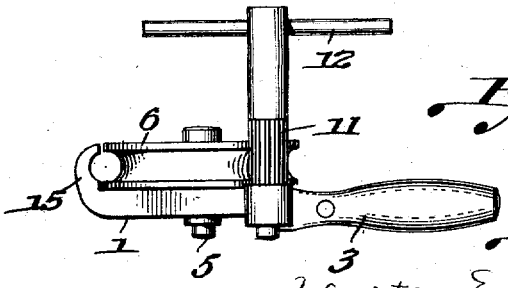
Fig. 4 is a bottom view.

The body 1 is provided with a hook 2 and a handle 3, rigidly connected to, or integral with, said body. A depressed surface 4 may be provided in the handle to receive the name and address of the manufacturer.

A headed pin 5, which is secured to and projects from the body 1, serves as a stub-shaft to mount a sheave 6 which has gear teeth or a mutilated gear 7 and is provided with a flattened part 8.

Mounted to turn in a bearing 9 on the body 1, is the shaft 10 having a pinion 11 meshing with teeth 7 and provided with a handle 12.

Secured to the flattened part 8 by a machine screw 13 is a bending plate 14 having a hook 15.

A piece of tube or pipe undergoing bending is shown at 16.

If desired, the inner surface of hook 15 may have teeth, or corrugations to better grip the tube or pipe 16.

Having turned the handle 12 to position the hook 15 opposite the groove in sheave 6, the tube or pipe 16 is passed through the hook 2 and engaged with the hook 15.

The operator grasps handles 3 and 12 and turns the latter to bend the pipe or tube into the curve or angle desired. The diameter of pinion 11 being small in relation to that of sheave 6, the tube or pipe is easily bent. As the appliance is light and small it may be readily carried about by the user. It is also to be noted that when the work, i. e., the pipe or tube to be bent, is fixed in position, the bending device requires no support other than that afforded by the work itself after being applied thereto. Thus, in installations where pipes or tubes are placed and secured in position up to the points where bends are to be made to accommodate the desired connections, etc., the bending device may simply be applied to the work as above set forth and the bending operations may then be performed merely by turning the handle 12, without holding the handle 3. This leaves one hand of the operator free, which is obviously a desirable condition.

What we claim is:

1. The hereindescribed portable pipe and tube bender, comprising a body having a pipe-engaging hook at one end and a handle at its other end to enable said bender to be held by the operator, a sheave having a grooved edge and journalled to the body, said sheave being provided with gear teeth, said sheave and hook lying in substantially the same plane, an elongated bending plate attached to the sheave and lying in the plane thereof, said plate having a hooked end projecting over the grooved edge of the sheave and adapted to grip the pipe or tube to be bent, the firstnamed hook serving as an abutment for the pipe or tube, a shaft mounted on the body and provided with a pinion which meshes with the gear teeth of the sheave, and a handle whereby said shaft may be turned.

2. A device for bending pipes and the like, comprising a body member, a wheel rotatably mounted on said body member and having a peripheral groove therein for forming the desired bends in the work and also having gear teeth formed integrally around a portion of its periphery and lying in part on each side of the medial plane of said groove, a pinion rotatably mounted on said body member and having its axis fixed with respect to said body member and its teeth meshing with the gear teeth of said wheel, and means for imparting rotation to said pinion.

3. A device for bending pipes and the like, comprising a body member, a wheel rotatably mounted on said body member and having a peripheral groove therein for forming the desired bends in the work and also having gear teeth formed integrally around a portion of its periphery and substantially in the plane of said groove, a pinion rotatably mounted on said body member and having its teeth meshing with the gear teeth of said wheel, a handle for imparting rotation to said pinion, and guiding means on said body member for engaging the work, the entire device being constructed as a readily portable hand tool requiring no fixed support, and said guiding means cooperating with the work when the latter is fixed in position so that the device may be operated without any support other than that afforded by the work itself.

4. A device for bending pipes and the like, comprising a body member, a wheel rotatably mounted on said body member and having a peripheral groove therein for forming the desired bends in the work, means for effecting relative rotation between said wheel and said body member, and guiding means on said body member for engaging the work, the entire device being constructed as a readily portable hand tool requiring no fixed support, and said guiding means cooperating with the work when the latter is fixed in position so that the device may be operated without any support other than that afforded by the work itself.

5. A device for bending pipes and the like, comprising a body member, a wheel rotatably mounted on said body member and having a peripheral groove therein for forming the desired bends in the work, means for effecting relative rotation between said wheel and said body member, guiding means on said body member for engaging the work, and a handle on said body member for carrying and supporting the device, the entire device being constructed as a readily portable hand tool requiring no support in operation other than that of the hand of the operator on said handle, and said guiding means cooperating with the work when the latter is fixed in position so that the device may be operated without any support other than that afforded by the work itself.

6. A device for bending pipes and the like, comprising a wheel having a peripheral groove therein for forming the desired bends in the work and having a portion thereof cut away to leave a flat surface extending along a chord of the periphery of the wheel, and means for holding the work in desired relation to said peripheral groove, comprising a hooked member pivotally mounted on said flat surface for movement transversely of the wheel.

7. A device for bending pipes and the like, comprising a wheel having a peripheral groove therein for forming the desired bends in the work, and a hooked member pivotally mounted on said wheel for movement into and out of engagement with the work to hold the latter in desired relation to the said peripheral groove in said wheel during operation of the device, such movement taking place only in a plane transverse to that of said wheel.

8. A device for bending pipes and the like, comprising a body member, a wheel pivotally mounted on said body member and having a peripheral groove therein for forming the desired bends in the work, rotatable means coacting directly between said wheel and said body member for effecting relative rotation therebetween, and a grooved abutment formed integrally with said body member for guiding the work in desired relation to said wheel.

9. A device for bending pipes and the like, comprising a body member, a wheel pivotally mounted on said body member and having a peripheral groove of substantially semi-circular cross-section therein for forming the desired bends in the work, rotatable means coacting directly between said wheel and said body member for effecting relative rotation therebetween, and an abutment formed integrally with said body member with one end thereof lying in substantially tangential relation to said wheel and having a substantially semi-cylindrical groove therein with its cross-section complementary to that of the peripheral groove in said wheel at the place of tangency of said abutment and wheel, said abutment guiding the work in desired relation to said wheel.

10. A device for bending pipes and the like, comprising a body member, a wheel pivotally mounted on said body member and having a peripheral groove of substantially semi-circular cross-section therein for forming the desired bends in the work, rotatable means coacting directly between said wheel and said body member for effecting relative rotation therebetween, and an abutment on said body member with one end thereof lying in substantially tangential relation to said wheel and having an elongated, substantially semi-cylindrical groove therein with its cross-section complementary to that of the peripheral groove in said wheel at the place of tangency of said abutment and wheel, said abutment guiding the work in desired relation to said wheel.

In witness whereof, we have hereunto subscribed our names.

WALTER ESTES HOLSCLAW.
HARRY ELSTON HOLSCLAW.